(12) United States Patent
Betz

(10) Patent No.: US 7,464,090 B2
(45) Date of Patent: Dec. 9, 2008

(54) OBJECT CATEGORIZATION FOR INFORMATION EXTRACTION

(75) Inventor: Jonathan T. Betz, Summit, NJ (US)

(73) Assignee: Google Inc., Mountain View, CA (US)

(*) Notice: Subject to any disclaimer, the term of this patent is extended or adjusted under 35 U.S.C. 154(b) by 340 days.

(21) Appl. No.: 11/341,069

(22) Filed: Jan. 27, 2006

(65) Prior Publication Data

US 2007/0203868 A1    Aug. 30, 2007

(51) Int. Cl.
*G06F 17/00* (2006.01)
*G06F 17/30* (2006.01)

(52) U.S. Cl. .................................. 707/6; 707/104.1
(58) Field of Classification Search .................. 707/6, 707/3, 7, 102
See application file for complete search history.

(56) References Cited

U.S. PATENT DOCUMENTS

| | | | |
|---|---|---|---|
| 5,475,819 A | 12/1995 | Miller et al. | |
| 5,560,005 A | 9/1996 | Hoover et al. | |
| 5,574,898 A | 11/1996 | Leblang et al. | |
| 5,943,670 A * | 8/1999 | Prager | 707/5 |
| 6,665,659 B1* | 12/2003 | Logan | 707/3 |
| 2003/0154071 A1 | 8/2003 | Shreve | |
| 2004/0107125 A1 | 6/2004 | Guheen et al. | |
| 2006/0036504 A1* | 2/2006 | Allocca et al. | 705/26 |
| 2006/0152755 A1* | 7/2006 | Curtis et al. | 358/1.15 |
| 2007/0005639 A1* | 1/2007 | Gaussier et al. | 707/103 R |

FOREIGN PATENT DOCUMENTS

WO    WO 01/27713 A2 *    4/2001

OTHER PUBLICATIONS

Brill, E. et al., "An Analysis of the AskMSR Question-Answering System," Proceedings of the Conference on Empirical Methods in Natural Language Processing (EMNLP), Jul. 2002, pp. 257-264.
Brin, S., "Extracting Patterns and Relations from the World Wide Web," 12 pages, no date.
Chang, C. et al., "IEPAD: Information Extraction Based on Pattern Discovery," WWW10 '01, ACM, May 1-5, 2001, pp. 681-688.
Chu-Carroll, J. et al., "A Multi-Strategy with Multi-Source Approach to Question Answering," 8 pages, no date.
Dean, J. et al., "MapReduce: Simplified Data Processing on Large Clusters," To appear in OSDI 2004, pp. 1-13.
Etzioni, O. et al., "Web-scale Information Extraction in KnowItAll (Preliminary Results)," WWW2004, ACM, May 17-20, 2004, 11 pages.

(Continued)

*Primary Examiner*—Uyen T. Le
(74) *Attorney, Agent, or Firm*—Morgan, Lewis & Bockius LLP

(57) ABSTRACT

A system and method for categorizing objects on the basis of the existence of the facts describing those objects. Objects may be stored in the collection regardless of their category, and each object may have any number of facts associated with it. The objects are then categorized on the basis of their data structure, that is, on the basis of the existence of the facts associated with that object.

21 Claims, 12 Drawing Sheets

| Recognizer of Category | Key attributes | Threshold |
|---|---|---|
| Person | name<br>birthday | 2 |
| Weather page | morning<br>afternoon<br>tonight<br>tomorrow<br>Barometer<br>sunrise<br>sunset<br>dewpoint<br>visibility<br>pressure<br>temperature<br>temp<br>wind<br>humidity | Greater of 4 and 75% the number of facts associated with an object |
| Image summary | Album name<br>Filename<br>URL<br>File size<br>Displayed dimensions | 5 |
| Direction list | Step ?i | Number facts associated with object |
| Book | ISBN<br>Title<br>Author<br>Publisher | 1 if 'ISBN' attribute present, 2 otherwise |

OTHER PUBLICATIONS

Freitag, D. et al., "Boosted Wrapper Induction," American Association for Artificial Intelligence, 2000, 7 pages.

Guha, R. et al., "Disambiguating People in Search," WWW2004, ACM, May 17-22, 2004, 9 pages.

Guha, R., "Object Co-Indentification on the Semantic Web," WWW2004, ACM, May 17-22, 2004, 9 pages.

Hogue, A.W., "Tree Pattern Inference and Matching for Wrapper Induction on the World Wide Web," Master of Engineering in Electrical Engineering and Computer Science, Massachusetts Institute of Technology, Jun. 2004, pp. 1-106.

"Information Entropy—Wikipedia, the free encyclopedia," [online] [Retrieved on May 3, 2006] Retrieved from the Internet<URL:http://en.wikipedia.org/wiki/Information_entropy>.

"Information Theory—Wikipedia, the free encyclopedia," [online] [Retrieved on May 3, 2006] Retrieved from the Internet<URL:http://en.wikipedia.org/wiki/information_theory>.

Jones, R. et al., "Bootstrapping for Text Learning Tasks," 12 pages, no date.

Kosseim, L, et al., "Answer Formulation for Question-Answering," 11 pages, no date.

Liu, B. et al., "Mining Data Records in Web Pages," Conference '00, ACM, 2000, pp. 1-10.

McCallum, A. et al., "Object Consolodation by Graph Partitioning with a Conditionally-Trained Distance Metric," SIGKDD '03, ACM, Aug. 24-27, 2003, 6 pages.

Mihalcea, R. et al., "PageRank on Semantic Networks, with Application to Word Sense Disambiguation," 7 pages, no date.

Mihalcea, R. et al., "TextRank: Bringing Order into Texts," 8 pages, no date.

PCT International Search Report and Written Opinion, PCT/US06/07639, Sep. 13, 2006, 6 pages.

Prager, J. et al., "IBM's Piquant in TREC2003," 10 pages, no date.

Prager, J. et al., "Question Answering using Constraint Satisfaction: QA-by-Dossier-with-Constraints," 8 pages, no date.

Ramakrishnan, G. et al., "Is Question Answering an Acquired Skill?", WWW2004, ACM, May 17, 2004, pp. 111-120.

* cited by examiner

Facts A – Before Object
Categorization Janitor
Attributes  Values
Name      Nikolai Pavlovich
Birthday  7/6/1796

Facts A – After Object
Categorization Janitor
Attributes  Values
Name      Nikolai Pavlovich
Birthday  7/6/1796
Category  Person Facts B – Before Object
Categorization Janitor
Attributes  Values
Name    Russia in Search of Itself
Author  James H. Billington
ISBN    0801879760
Pages   256

Facts B – After Object
Categorization Janitor
Attributes  Values
Name     Russia in Search of Itself
Author   James H. Billington
ISBN     0801879760
Pages    256
Category Book Facts C – Before Object
Categorization Janitor
Attributes  Values
Step 1  Put beef in cold water
Step 2  Remove grease froth
Step 3  Cut beets into thin sticks
Step 4  Add chopped cabbage
Step 5  Serve with sour cream Facts C – After Object
Categorization Janitor
Attributes  Values
Step 1    Put beef in cold water
Step 2    Remove grease froth
Step 3    Cut beets into thin sticks
Step 4    Add chopped cabbage
Step 5    Serve with sour cream
Category  Directions

FIG. 5

| Recognizer of Category | Key attributes | Threshold |
|---|---|---|
| Person | name<br>birthday | 2 |
| Weather page | morning<br>afternoon<br>tonight<br>tomorrow<br>Barometer<br>sunrise<br>sunset<br>dewpoint<br>visibility<br>pressure<br>temperature<br>temp<br>wind<br>humidity | Greater of 4 and 75% the number of facts associated with an object |
| Image summary | Album name<br>Filename<br>URL<br>File size<br>Displayed dimensions | 5 |
| Direction list | Step ?i | Number facts associated with object |
| Book | ISBN<br>Title<br>Author<br>Publisher | 1 if 'ISBN' attribute present, 2 otherwise |

FIG. 8

OBJECT CATEGORIZATION FOR INFORMATION EXTRACTION

CROSS REFERENCE TO RELATED APPLICATIONS

This application is related to the following U.S. Applications all of which are incorporated by reference herein:

U.S. application Ser. No. 11/342,290, entitled "Data Object Visualization", filed on Jan. 27, 2008, by Andrew W. Hogue, David Vespe, Alex Kehlenbeck, Mike Gordon, Jeffrey C. Reynar, David Alpert;

U.S. application Ser. No. 11/342,293 entitled "Data Object Visualization Using Maps", filed on Jan. 27, 2006, by Andrew W. Hogue, David Vespe, Alex Kehlenbeck, Mike Gordon, Jeffrey C. Reynar, David Alpert;

U.S. application Ser. No. 11/341,907, entitled "Designating Data Objects for Analysis", filled on Jan. 27, 2006, by Andrew W. Hogue, David Vespe, Alex Kehelenbek, Mike Gordon, Jeffrey C. Reynar, David Alpert;

U.S. application Ser. No. 11/342,277 entitled "Data Object Visualization Using Graphs", filed on Jan. 27, 2006, by Andrew W. Hogue, David Vespe, Alex Kehlenbeck, Mike Gordon, Jeffrey C. Reynar, David Alpert.

BACKGROUND OF THE INVENTION

1. Field of the Invention

The disclosed embodiments relate generally to information management and organization. More particularly, the disclosed embodiments relate to categorizing objects and facts gathered from diverse sources.

2. Description of Related Art

When data is gathered from diverse sources, the data often represents a wide variety of things. For example, when data is gathered from the world wide web, the data might represent things of diverse categories such as historical figures, recipes, e-mail exchanges, and so on. While it is often desirable to determine to what category the data belongs, categorizing the data can be difficult because the data may belong to a large number of categories and all the same types of information about the data may not be available. What is a needed is a method for categorizing data that is from diverse sources.

SUMMARY OF THE INVENTION

The invention is a system and method for categorizing objects on the basis of the existence of the facts describing those objects. Objects may be stored in a collection regardless of their category, and each object may have any number of facts associated with it. The objects are then categorized on the basis of their data structure, that is, on the basis of the existence of the-facts associated with that object. Categorizing objects on the basis of the existence of the facts associated with those objects is robust in situations in which the information known about objects is inconsistently or incompletely available, for example, such as in the processing of information extracted from the web.

BRIEF DESCRIPTION OF THE DRAWINGS

FIG. 5 is chart illustrating an example of identifying various categories, according to one embodiment of the present invention.

FIG. 8 is a chart illustrating an example of different kinds of category recognizers.

DETAILED DESCRIPTION OF THE EMBODIMENTS

Embodiments of the present invention are now described with reference to the figures where like reference numbers indicate identical or functionally similar elements.

Figure 1:
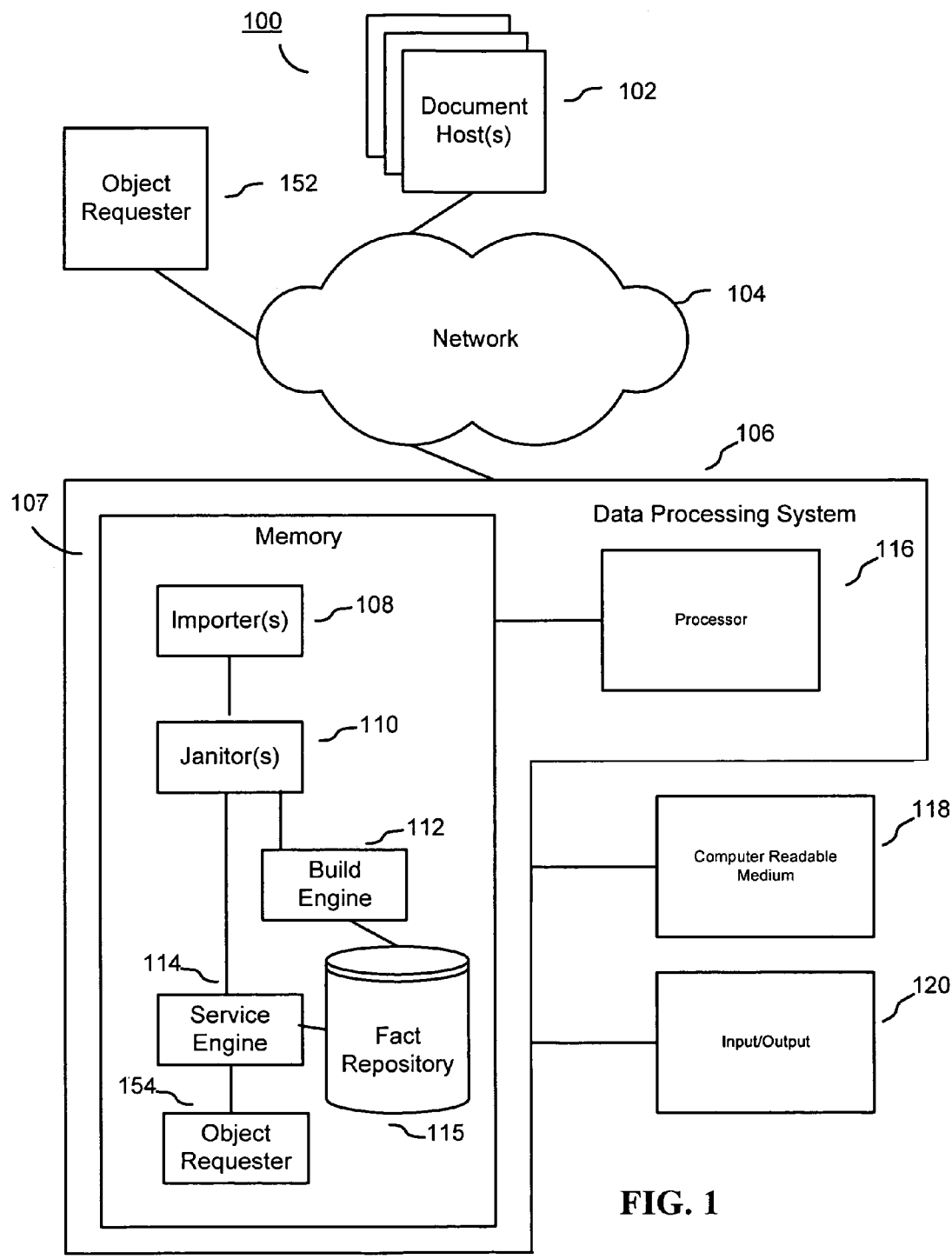
FIG. 1 shows a network, in accordance with a preferred embodiment of the invention.

FIG. 1 shows a system architecture 100 adapted to support one embodiment of the invention. FIG. 1 shows components used to add facts into, and retrieve facts from a repository 115. The system architecture 100 includes a network 104, through which any number of document hosts 102 communicate with a data processing system 106, along with any number of object requesters 152, 154.

Document hosts 102 store documents and provide access to documents. A document is comprised of any machine-readable data including any combination of text, graphics, multimedia content, etc. A document may be encoded in a markup language, such as Hypertext Markup Language (HTML), i.e., a web page, in a interpreted language (e.g., JavaScript) or in any other computer readable or executable format. A document can include one or more hyperlinks to other documents. A typical document will include one or more facts within its content. A document stored in a document host 102 may be located and/or identified by a Uniform Resource Locator (URL), or Web address, or any other appropriate form of identification and/or location. A document host 102 is implemented by a computer system, and typically includes a server adapted to communicate over the network 104 via networking protocols (e.g., TCP/IP), as well as application and presentation protocols (e.g., HTTP, HTML, SOAP, D-HTML, Java). The documents stored by a host 102 are typically held in a file directory, a database, or other data repository. A host 102 can be implemented in any computing device (e.g., from a PDA or personal computer, a workstation, mini-computer, or mainframe, to a cluster or grid of computers), as well as in any processor architecture or operating system.

FIG. 1 shows components used to manage facts in a fact repository 115. Data processing system 106 includes one or more importers 108, one or more janitors 110, a build engine 112, a service engine 114, and a fact repository 115 (also called simply a "repository"). Each of the foregoing are implemented, in one embodiment, as software modules (or programs) executed by processor 116. Importers 108 operate to process documents received from the document hosts, read the data content of documents, and extract facts (as operationally and programmatically defined within the data processing system 106) from such documents. The importers 108 also determine the subject or subjects with which the facts are associated, and extract such facts into individual items of data, for storage in the fact repository 115. In one embodiment, there are different types of importers 108 for different types of documents, for example, dependent on the format or document type.

Janitors 110 operate to process facts extracted by importer 108. This processing can include but is not limited to, data cleansing, object merging, and fact induction. In one embodiment, there are a number of different janitors 110 that perform different types of data management operations on the facts. For example, one janitor 110 may traverse some set of facts in the repository 115 to find duplicate facts (that is, facts that convey the same factual information) and merge them. Another janitor 110 may also normalize facts into standard formats. Another janitor 110 may also remove unwanted facts from repository 115, such as facts related to pornographic content. Other types of janitors 110 may be implemented, depending on the types of data management functions desired, such as translation, compression, spelling or grammar correction, and the like. A janitor for categorizing objects will be described herein with reference to FIGS. 3-8.

Various janitors 110 act on facts to normalize attribute names, and values and delete duplicate and near-duplicate facts so an object does not have redundant information. For example, we might find on one page that Britney Spears' birthday is "12/2/1981" while on another page that her date of birth is "Dec. 2, 1981." Birthday and Date of Birth might both be rewritten as Birthdate by one janitor and then another janitor might notice that 12/2/1981 and Dec. 2, 1981 are different forms of the same date. It would choose the preferred form, remove the other fact and combine the source lists for the two facts. As a result when you look at the source pages for this fact, on some you'll find an exact match of the fact and on others text that is considered to be synonymous with the fact.

Build engine 112 builds and manages the repository 115. Service engine 114 is an interface for querying the repository 115. Service engine 114's main function is to process queries, score matching objects, and return them to the caller but it is also used by janitor 110.

Repository 115 stores factual information extracted from a plurality of documents that are located on document hosts 102. A document from which a particular fact may be extracted is a source document (or "source") of that particular fact. In other words, a source of a fact includes that fact (or a synonymous fact) within its contents.

Repository 115 contains one or more facts. In one embodiment, each fact is associated with exactly one object. One implementation for this association includes in each fact an object ID that uniquely identifies the object of the association. In this manner, any number of facts may be associated with an individual object, by including the object ID for that object in the facts. In one embodiment, objects themselves are not physically stored in the repository 115, but rather are defined by the set or group of facts with the same associated object ID, as described below. Further details about facts in repository 115 are described below, in relation to FIGS. 2(a)-2(d).

It should be appreciated that in practice at least some of the components of the data processing system 106 will be distributed over multiple computers, communicating over a network. For example, repository 115 may be deployed over multiple servers. As another example, the janitors 110 may be located on any number of different computers. For convenience of explanation, however, the components of the data processing system 106 are discussed as though they were implemented on a single computer.

In another embodiment, some or all of document hosts 102 are located on data processing system 106 instead of being coupled to data processing system 106 by a network. For example, importer 108 may import facts from a database that is a part of or associated with data processing system 106.

FIG. 1 also includes components to access repository 115 on behalf of one or more object requesters 152, 154. Object requesters are entities that request objects from repository 115. Object requesters 152, 154 may be understood as clients of the system 106, and can be implemented in any computer device or architecture. As shown in FIG. 1, a first object requester 152 is located remotely from system 106, while a second object requester 154 is located in data processing system 106. For example, in a computer system hosting a blog, the blog may include a reference to an object whose facts are in repository 115. An object requester 152, such as a browser displaying the blog will access data processing system 106 so that the information of the facts associated with the object can be displayed as part of the blog web page. As a second example, janitor 110 or other entity considered to be part of data processing system 106 can function as object requester 154, requesting the facts of objects from repository 115.

FIG. 1 shows that data processing system 106 includes a memory 107 and one or more processors 116. Memory 107 includes importers 108, janitors 110, build engine 112, service engine 114, and requester 154, each of which are preferably implemented as instructions stored in memory 107 and executable by processor 116. Memory 107 also includes repository 115. Repository 115 can be stored in a memory of one or more computer systems or in a type of memory such as a disk. FIG. 1 also includes a computer readable medium 118 containing, for example, at least one of importers 108, janitors 110, build engine 112, service engine 114, requester 154, and at least some portions of repository 115. FIG. 1 also includes one or more input/output devices 120 that allow data to be input and output to and from data processing system 106. It will be understood that data processing system 106 preferably also includes standard software components such as operating systems and the like and further preferably includes standard hardware components not shown in the figure for clarity of example.

Figure 2A:
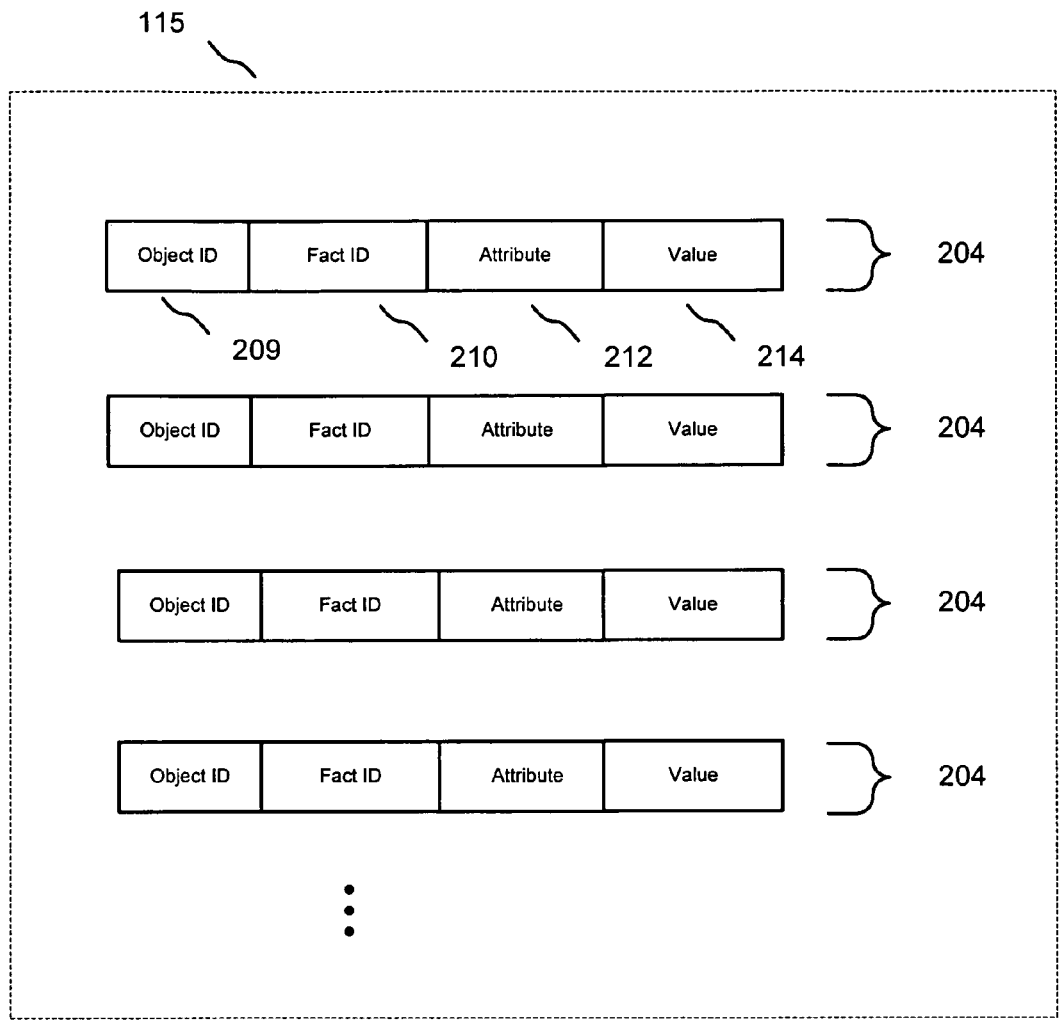
FIGS. 2(a)-2(d) are block diagrams illustrating a data structure for facts within a repository of FIG. 1 in accordance with preferred embodiments of the invention.

FIG. 2(a) shows an example format of a data structure for facts within repository 115, according to some embodiments of the invention. As described above, the repository 115 includes facts 204. Each fact 204 includes a unique identifier for that fact, such as a fact ID 210. Each fact 204 includes at least an attribute 212 and a value 214. For example, a fact associated with an object representing George Washington may include an attribute of "date of birth" and a value of "Feb. 22, 1732." In one embodiment, all facts are stored as alphanumeric characters since they are extracted from web pages. In another embodiment, facts also can store binary data values. Other embodiments, however, may store fact values as mixed types, or in encoded formats.

As described above, each fact is associated with an object ID 209 that identifies the object that the fact describes. Thus, each fact that is associated with a same entity (such as George Washington), will have the same object ID 209. In one embodiment, objects are not stored as separate data entities in memory. In this embodiment, the facts associated with an object contain the same object ID, but no physical object exists. In another embodiment, objects are stored as data entities in memory, and include references (for example, pointers or IDs) to the facts associated with the object. The logical data structure of a fact can take various forms; in general, a fact is represented by a tuple that includes a fact ID, an attribute, a value, and an object ID. The storage implementation of a fact can be in any underlying physical data structure.

Figure 2B:
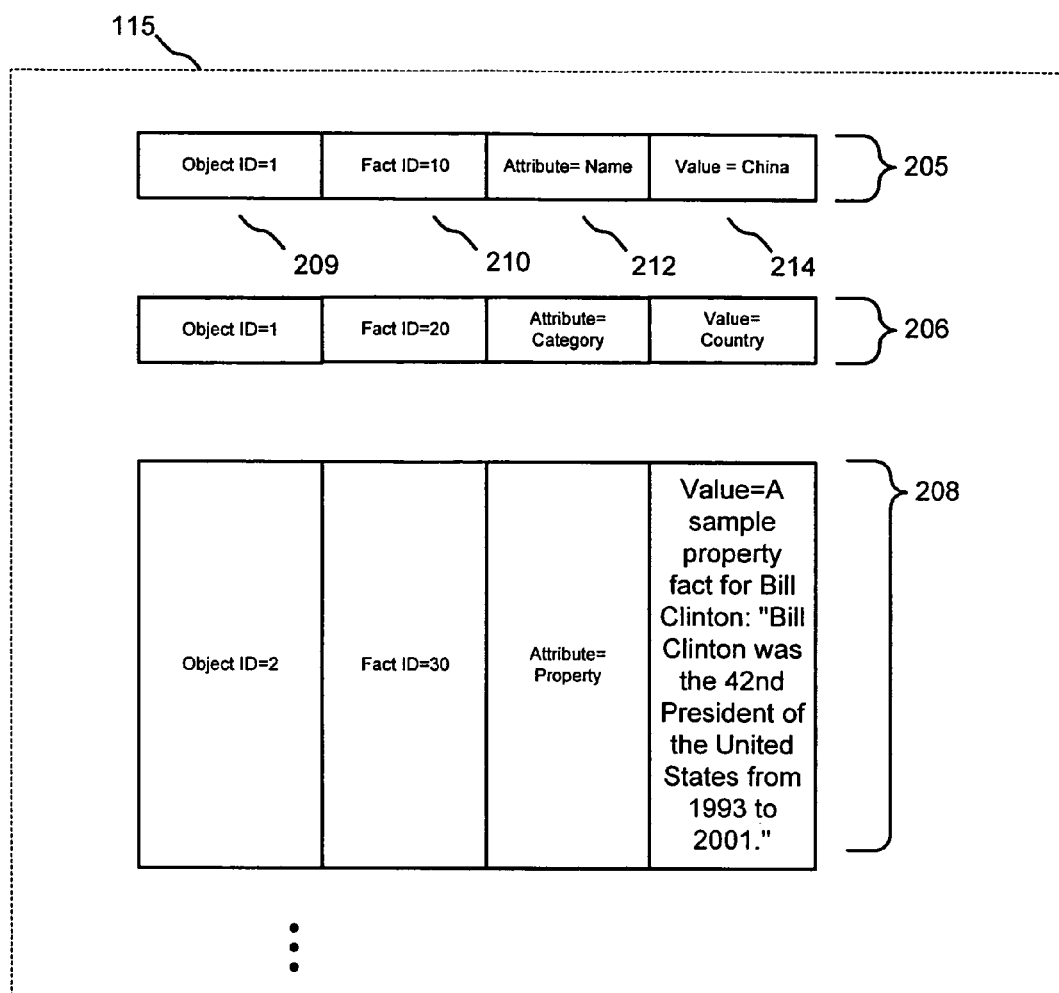

FIG. 2(b) shows an example of facts having respective fact IDs of 10, 20, and 30 in repository 115. Facts 10 and 20 are associated with an object identified by object ID "1." Fact 10 has an attribute of "Name" and a value of "China." Fact 20 has an attribute of "Category" and a value of "Country." Thus, the object identified by object ID "1" has a name fact 205 with a value of "China" and a category fact 206 with a value of "Country." Fact 30 208 has an attribute of "Property" and a value of "Bill Clinton was the 42nd President of the United States from 1993 to 2001." Thus, the object identified by object ID "2" has a property fact with a fact ID of 30 and a value of "Bill Clinton was the 42nd President of the United States from 1993 to 2001." In the illustrated embodiment, each fact has one attribute and one value. The number of facts associated with an object is not limited; thus while only two facts are shown for the "China" object, in practice there may be dozens, even hundreds of facts associated with a given object. Also, the value fields of a fact need not be limited in size or content. For example, a fact about the economy of "China" with an attribute of "Economy" would have a value including several paragraphs of text, numbers, perhaps even tables of figures. This content can be formatted, for example, in a markup language. For example, a fact having an attribute "original html" might have a value of the original html text taken from the source web page.

Also, while the illustration of FIG. 2(b) shows the explicit coding of object ID, fact ID, attribute, and value, in practice the content of the fact can be implicitly coded as well (e.g., the first field being the object ID, the second field being the fact ID, the third field being the attribute, and the fourth field being the value). Other fields include but are not limited to: the language used to state the fact (English, etc.), how important the fact is, the source of the fact, a confidence value for the fact, and so on.

Figure 2C:
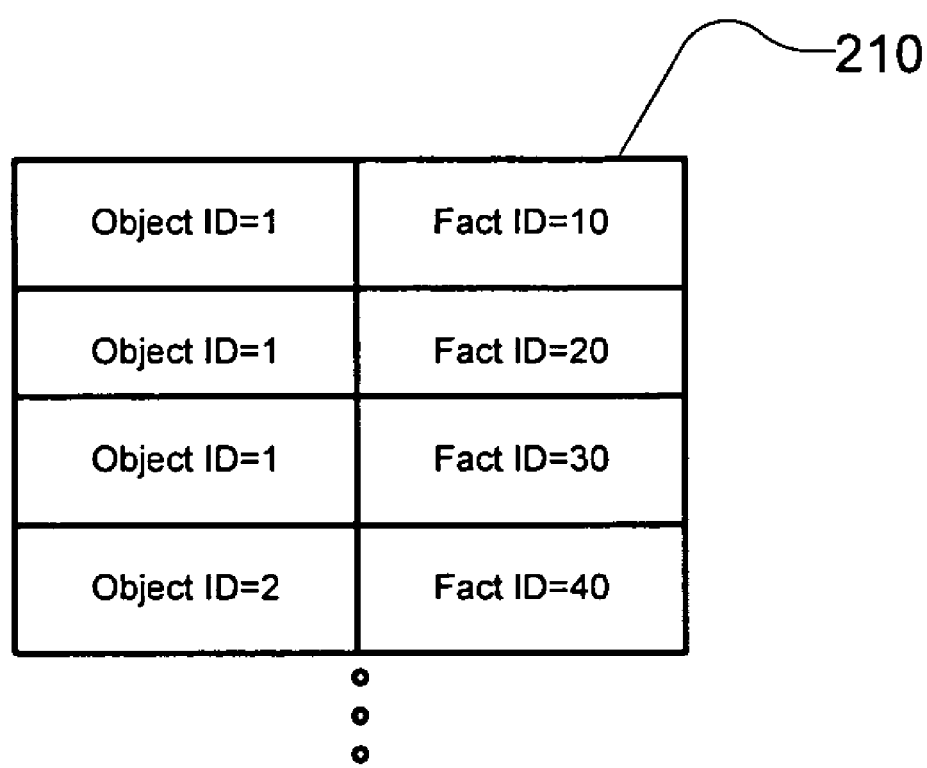

FIG. 2(c) shows an example object reference table 210 that is used in some embodiments. Not all embodiments include an object reference table. The object reference table 210 functions to efficiently maintain the associations between object IDs and fact IDs. In the absence of an object reference table 210, it is also possible to find all facts for a given object ID by querying the repository to find all facts with a particular object ID. While FIGS. 2(b) and 2(c) illustrate the object reference table 210 with explicit coding of object and fact IDs, the table also may contain just the ID values themselves in column or pair-wise arrangements.

Figure 2D:
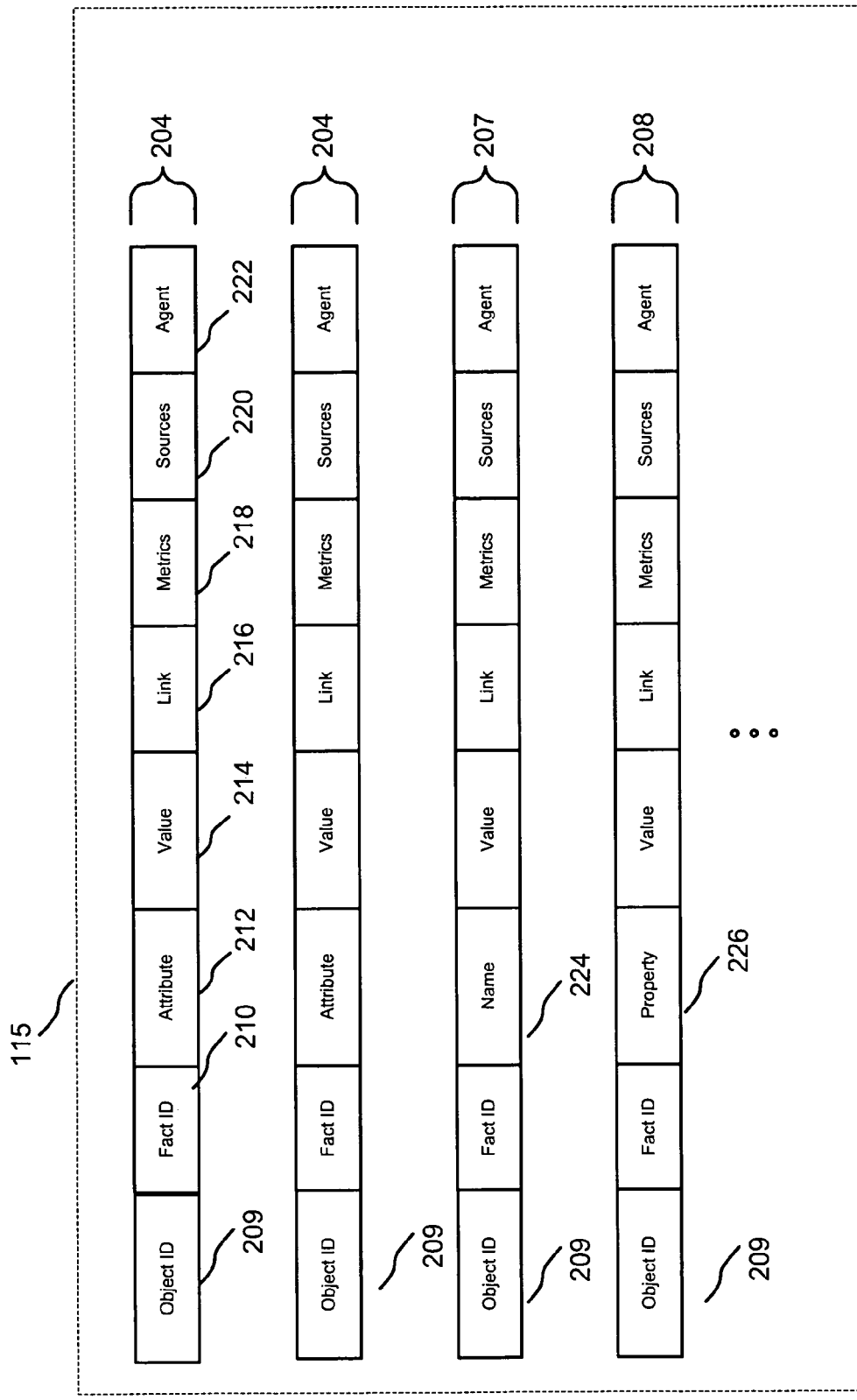

FIG. 2(d) shows an example of a data structure for facts within repository 115, according to some embodiments of the invention showing an extended format of facts. In this example, the fields include an object reference link 216 to another object. The object reference link 216 can be an object ID of another object in the repository 115, or a reference to the location (e.g., table row) for the object in the object reference table 210. The object reference link 216 allows facts to have as values other objects. For example, for an object "United States," there may be a fact with the attribute of "president" and the value of "George W. Bush," with "George W. Bush" being an object having its own facts in repository 115. In some embodiments, the value field 214 stores the name of the linked object and the link 216 stores the object identifier of the linked object. Thus, this "president" fact would include the value 214 of "George W. Bush", and object reference link 216 that contains the object ID for the for "George W. Bush" object. In some other embodiments, facts 204 do not include a link field 216 because the value 214 of a fact 204 may store a link to another object.

Each fact 204 also may include one or more metrics 218. A metric provides an indication of the some quality of the fact. In some embodiments, the metrics include a confidence level and an importance level. The confidence level indicates the likelihood that the fact is correct. The importance level indicates the relevance of the fact to the object, compared to other facts for the same object. The importance level may optionally be viewed as a measure of how vital a fact is to an understanding of the entity or concept represented by the object.

Each fact 204 includes a list of one or more sources 220 that include the fact and from which the fact was extracted. Each source may be identified by a Uniform Resource Locator (URL), or Web address, or any other appropriate form of identification and/or location, such as a unique document identifier.

The facts illustrated in FIG. 2(d) include an agent field 222 that identifies the importer 108 that extracted the fact. For example, the importer 108 may be a specialized importer that extracts facts from a specific source (e.g., the pages of a particular web site, or family of web sites) or type of source (e.g., web pages that present factual information in tabular form), or an importer 108 that extracts facts from free text in documents throughout the Web, and so forth.

Some embodiments include one or more specialized facts, such as a name fact 207 and a property fact 208. A name fact 207 is a fact that conveys a name for the entity or concept represented by the object ID. A name fact 207 includes an attribute 224 of "name" and a value, which is the name of the object. For example, for an object representing the country Spain, a name fact would have the value "Spain." A name fact 207, being a special instance of a general fact 204, includes the same fields as any other fact 204; it has an attribute, a value, a fact ID, metrics, sources, etc. The attribute 224 of a name fact 207 indicates that the fact is a name fact, and the value is the actual name. The name may be a string of characters. An object ID may have one or more associated name facts, as many entities or concepts can have more than one name. For example, an object ID representing Spain may have associated name facts conveying the country's common name "Spain" and the official name "Kingdom of Spain." As another example, an object ID representing the U.S. Patent and Trademark Office may have associated name facts conveying the agency's acronyms "PTO" and "USPTO" as well as the official name "United States Patent and Trademark Office." If an object does have more than one associated name fact, one of the name facts may be designated as a primary name and other name facts may be designated as secondary names, either implicitly or explicitly.

A property fact 208 is a fact that conveys a statement about the entity or concept represented by the object ID. Property facts are generally used for summary information about an object. A property fact 208, being a special instance of a general fact 204, also includes the same parameters (such as attribute, value, fact ID, etc.) as other facts 204. The attribute field 226 of a property fact 208 indicates that the fact is a property fact (e.g., attribute is "property") and the value is a string of text that conveys the statement of interest. For example, for the object ID representing Bill Clinton, the value of a property fact may be the text string "Bill Clinton was the 42nd President of the United States from 1993 to 2001." Some object IDs may have one or more associated property facts while other objects may have no associated property facts. It should be appreciated that the data structures shown in FIGS. 2(a)-2(d) and described above are merely exemplary. The data structure of the repository 115 may take on other forms. Other fields may be included in facts and some of the fields described above may be omitted. Additionally, each object ID may have additional special facts aside from name facts and property facts, such as facts conveying a type or category (for example, person, place, movie, actor, organization, etc.) for categorizing the entity or concept represented by the object ID. In some embodiments, an object's name(s) and/or properties may be represented by special records that have a different format than the general facts records 204.

As described previously, a collection of facts is associated with an object ID of an object. An object may become a null or empty object when facts are disassociated from the object. A null object can arise in a number of different ways. One type of null object is an object that has had all of its facts (including name facts) removed, leaving no facts associated with its object ID. Another type of null object is an object that has all of its associated facts other than name facts removed, leaving only its name fact(s). Alternatively, the object may be a null object only if all of its associated name facts are removed. A null object represents an entity or concept for which the data processing system 106 has no factual information and, as far as the data processing system 106 is concerned, does not exist. In some embodiments, facts of a null object may be left in the repository 115, but have their object ID values cleared (or have their importance to a negative value). However, the facts of the null object are treated as if they were removed from the repository 115. In some other embodiments, facts of null objects are physically removed from repository 115.

Figure 2E:
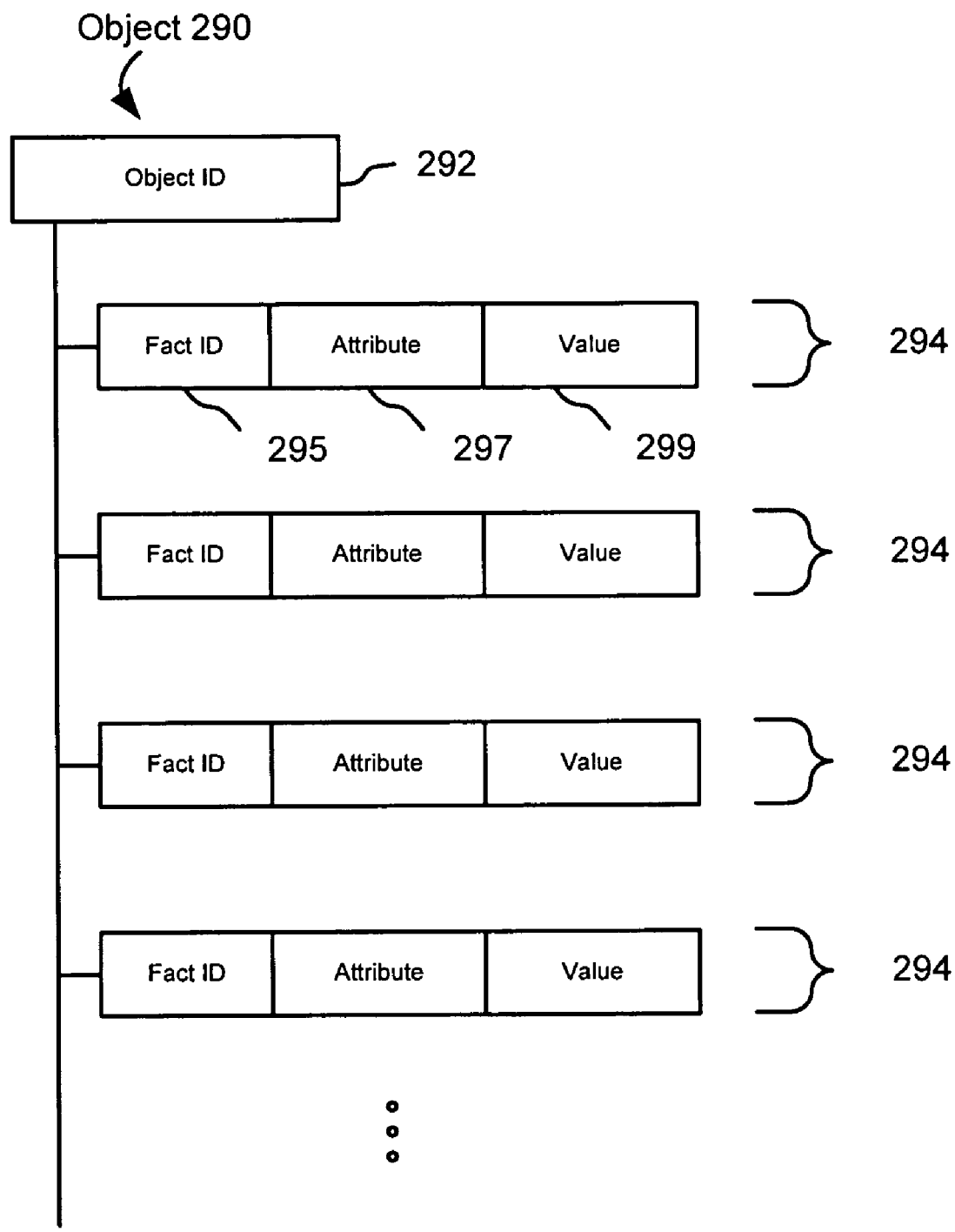
FIG. 2(e) is a block diagram illustrating an alternate data structure for facts and objects in accordance with preferred embodiments of the invention.

FIG. 2(e) is a block diagram illustrating an alternate data structure 290 for facts and objects in accordance with preferred embodiments of the invention. In this data structure, an object 290 contains an object ID 292 and references or points to facts 294. Each fact includes a fact ID 295, an attribute 297, and a value 299. In this embodiment, an object 290 actually exists in memory 107.

Figure 3A:
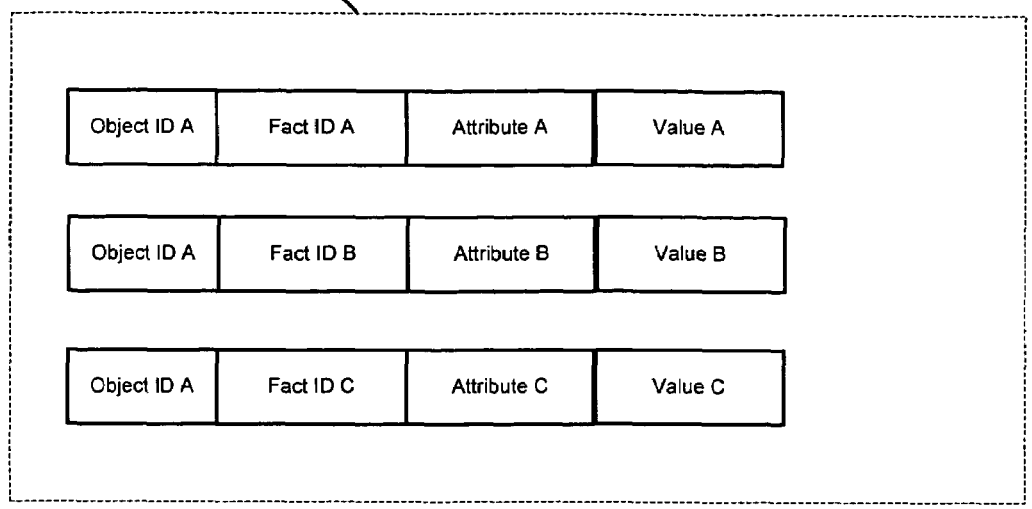
FIG. 3(a) is an illustration of an undifferentiated object.

FIG. 3(a) is an illustration of an undifferentiated object as it might exist in a fact repository such as the one illustrated herein with reference to FIG. 2(a). An object A is identified by Object ID A. Object A is associated with a variety of facts, for example, Fact A, Fact B, and Fact C, each fact having a fact ID, an attribute, and a value. FIG. 3(a) illustrates the structure of an object as it might be organized after processing by an importer.

Figure 3B:
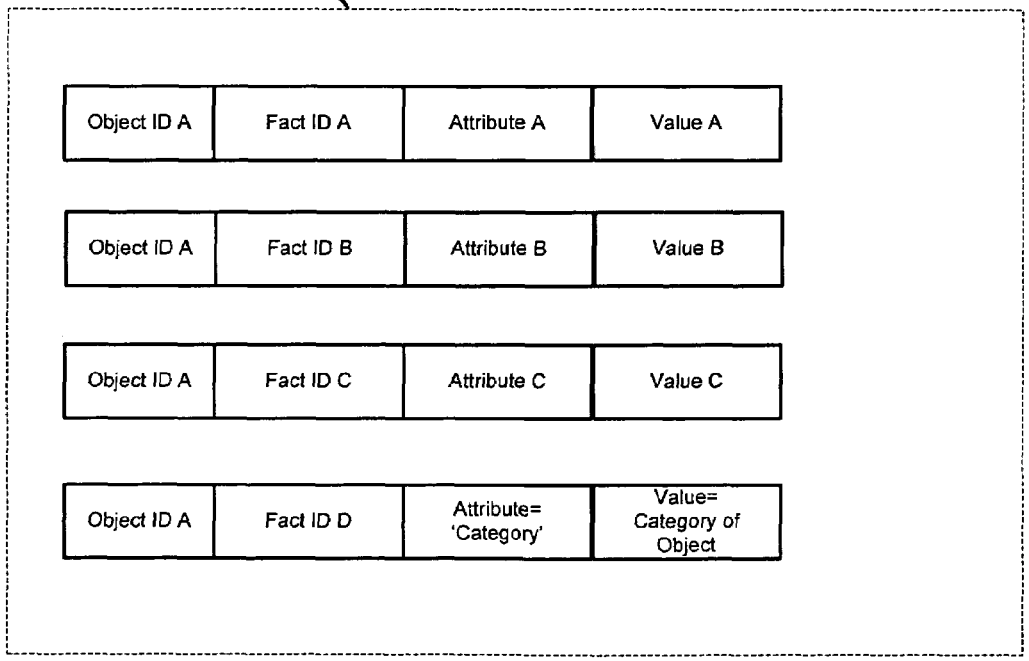
FIG. 3(b) is an illustration of a categorized object.

FIG. 3(b) is an illustration of a categorized object as it might exist in a fact repository such as the one illustrated herein with reference to FIG. 2(a). As in FIG. 3(a), object A is identified by Object ID A and is associated with a variety of facts, for example, Fact A, Fact B, and Fact C, each fact having a fact ID, an attribute, and a value. But object A is also associated with an additional fact, shown in the example as Fact D, which describes a category to which object A belongs. For the purposes of illustration, a fact describing the category of an object is referred to as a 'category fact'. In the example illustrated, Fact D has as its attribute an indication that it is a category fact, and has its value a descriptor of a category to which object A belongs.

The category fact has been selected herein for the purposes of illustration. According to one embodiment, a 'type' fact or 'kind' fact may be used in place of the category fact. It should be understood that any such generalization of the object described by the fact could be used in place of category fact, for example, facts related to genus, family, kind, type, status, or group. This list is not intended to be exhaustive, and it will be apparent to one of skill in the art that other examples or replacements of the category fact could be used without departing from the scope of the present invention.

Once a category fact has been associated with an object, the category of that object may be useful for a variety of purposes in the database. For example, it may be useful to display the category of an object to a user, or to organize search results on the basis of category. Furthermore, once the category of an object has been identified, other facts related to that object may sometimes be extracted from an information source. For example, if an object is determined to represent a 'person', an extraction engine may return to the source of the object and search for a birth date.

Having categories for objects also improves the confidence of associations between objects. For example, if an object categorized as a book is associated with an 'author' fact, the value of which links to another object, the category for the object pointed to by the 'author' fact may be significant for determining if the link is valid. For example, if the 'author' fact points to an object that is categorized as another book, then it could be determined that the link was invalid and should be removed or modified. Object categorization is similarly useful for the affirmative verification that links are proper.

Categorizing objects is also useful if a user would like to limit a search to objects of a certain category. For example, if a user is looking for information about a specific country, the database may respond to her request more usefully by returning only objects that are categorized as countries. Similarly, blacklisting categories may improve the relevancy of the data returned by a search. For example, if a database contains a large number of e-mails, it may be desirable to remove objects categorized as e-mails from the standard search.

Categorizing objects is also useful for prioritizing search results. For example, objects categorized as countries could always return ahead of objects categorized as people. Categorizing objects is beneficial for a wide range of purposes, including improving the organization, presentation, and prioritization of information in response to a search request.

Figure 4:
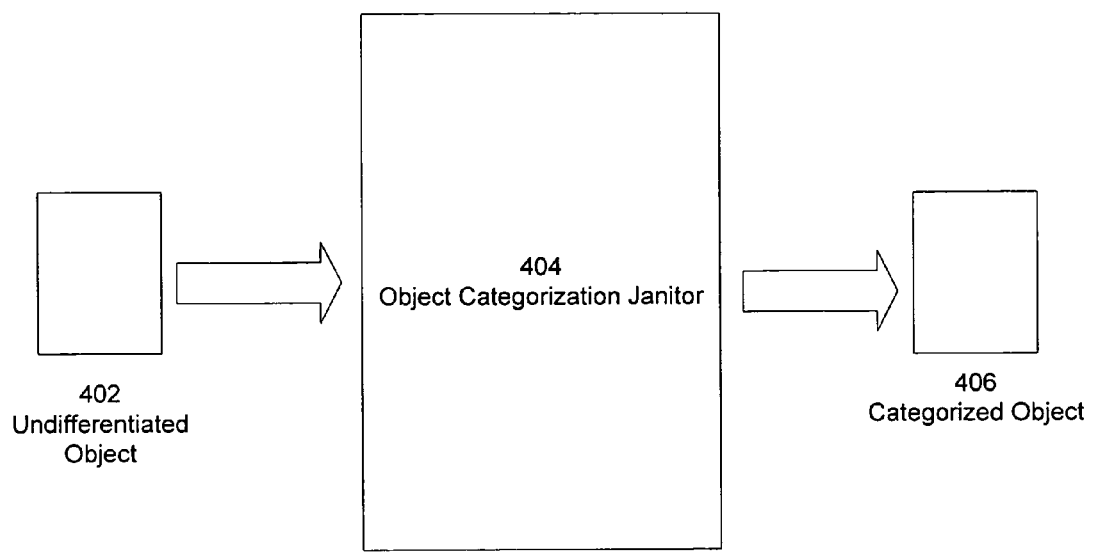
FIG. 4 is an illustration of the flow of data in an object categorization janitor, according to one embodiment of the present invention.

FIG. 4 is an illustration of the flow of data in an object categorization janitor, according to one embodiment of the present invention. The object categorization janitor 404 takes an undifferentiated object 402 as input and produces a categorized object 406 as output. The undifferentiated object 402 may be analogous to the undifferentiated object described herein with reference to FIG. 3(a), and the categorized object 406 may be analogous to the categorized object described herein with reference to FIG. 3(b).

According to one embodiment of the present invention, the object categorization janitor 404 may operate on a collection of undifferentiated object 402 to produce a collection of categorized objects 406.

The object categorization janitor 404 categorizes an object on the basis of the existence of facts. The method of the object categorization janitor, according to one embodiment of the present invention, will be described in greater detail herein with reference to FIGS. 5-8.

The object categorization janitor 404 may be reapplied to objects periodically, for example, to take advantage of new facts that may have been added to the database.

FIG. 5 is chart illustrating an example of categorizing various objects, according to one embodiment of the present invention. FIG. 5 illustrates one method by which objects may be categorized in the object categorization janitor.

According to one embodiment of the present invention, an object is categorized on the basis of the attributes of the facts associated with that object. For example, the object categorization janitor receives a collection of Facts A associated with some object. Facts A include a fact with the attribute of 'name' and another fact with the attribute of 'birthday'. On the basis of the existence of facts having both of these attributes, the object categorization janitor determines that Facts A describe a person, and associates the object with a new fact having attribute of 'category' and value of 'person'.

For the purposes of categorization, the values of the facts are frequently not relevant. The existence of facts describing the 'name' and the 'birthday' of an object is sufficiently indicative that the object is a person.

In another example, the object categorization janitor receives a collection of Facts B associated with some object. Facts B include a fact with the attributes of 'name', another fact with the attribute of 'author', another fact with the attribute of 'ISBN', and yet another fact with the attribute of 'pages'. On the basis of the existence of facts having some or all of these attributes, the object categorization janitor determines that Facts B describe a book, and associate the object with a new fact having attribute of 'category' and value of 'book'.

It is significant that the number of facts associated with an object is not predetermined or constrained. An object may have any number of facts describing it. In a data structure with such undefined properties, it would be difficult to categorize an object strictly responsive to the value of certain fields, as such fields may not even exist for a given object. Therefore, the object categorization janitor categorizes an object on the basis of the existence of the facts themselves.

For example, a method that determines that Facts B describe a book because the fact with attribute 'name' has value 'Russia in Search of Itself' would not only require prior knowledge of the book, but also would return indeterminate results for objects not having a 'name' attribute. On the other hand, by determining that Facts B describe a book on the basis of the existence certain facts, the method of one embodiment of the present invention does not require prior knowledge of the object in question, and also handles cases in which attributes are not uniformly assigned in the database.

In yet another example, the object categorization janitor receives a collection of Facts C associated with some object. Facts C includes facts with the attributes of 'Step 1', 'Step 2', and so on. On the basis of the existence of facts having some attributes matching a pattern, the object categorization janitor determines that Facts C describe directions, and associate the object with a new fact having attribute of 'category' and value of 'directions'. The method of categorizing objects used in one embodiment of the present invention allows categories to be based on the existence of facts of complex definition, allowing for sophisticated categorization of objects.

Figure 6:
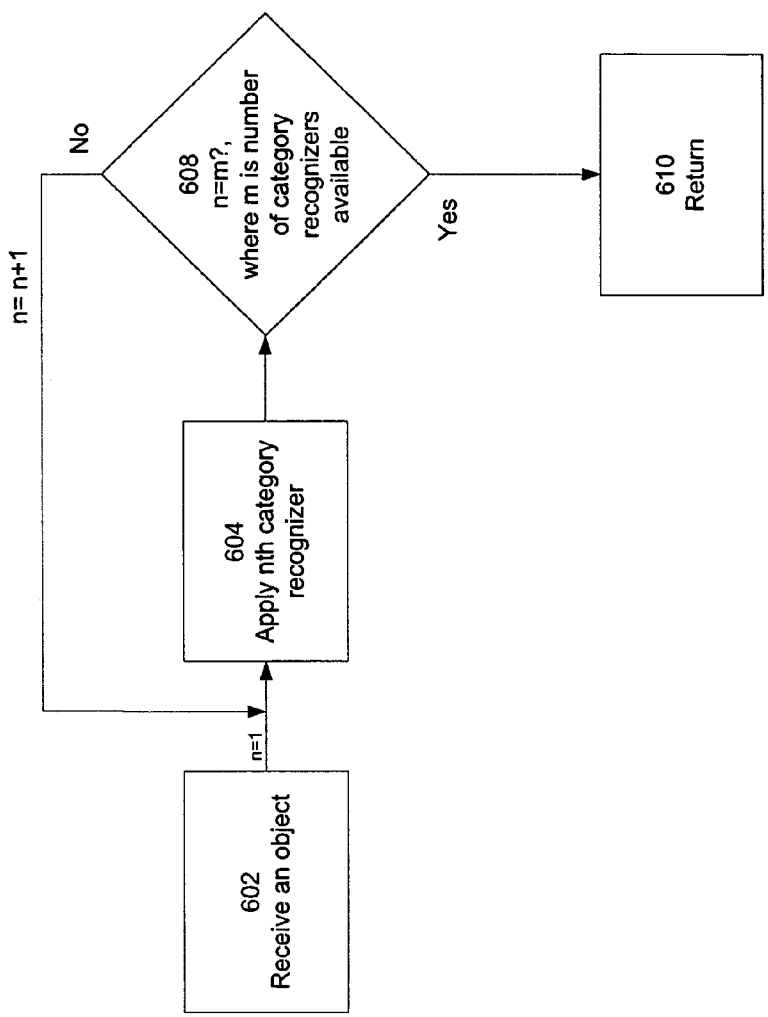
FIG. 6 is a flow chart illustrating a method for an object categorization janitor, according to one embodiment of the present invention.

FIG. 6 is a flow chart illustrating a method for determining the category of an object, according to one embodiment of the present invention. According to one embodiment of the present invention, the method is performed by the object categorization janitor.

The object categorization janitor receives 602 an object. The object categorization janitor initializes a counter variable, which for the purposes of illustration will be referred to as 'n', to the value 1.

The object categorization janitor applies 604 the nth category recognizer. The method of a category recognizer, according to one embodiment of the present invention, will be described in greater detail herein with reference to FIG. 7. The janitor may call the category recognizer, for example, either by passing in the object ID of the object to be recognized, or passing in the facts associated with that object.

The object categorization janitor determines 608 if there are additional category recognizers available. For example, the object categorization janitor may compare the counter variable, n, to the number of category recognizers available to the object categorization janitor, which for the purposes of illustration will be referred to as 'm'. If the counter variable equals the number of category recognizers available to the object categorization janitor, every available category recognizer has been tried and the object categorization janitor returns 610. If the counter variable does not equal the number of category recognizers available to the object categorization janitor, the object categorization janitor increments the counter variable and again applies 604 the nth category recognizer.

According to one embodiment of the present invention, the object categorization janitor applies category recognizers to the object until every category recognizer has been applied. An object may be associated with multiple category facts, so applying every category available recognizer is beneficial for associating an object with every category to which it belongs. According to another embodiment of the present invention, the object categorization janitor applies category recognizers to the object until either the category of the object has been identified or no further category recognizers are available. An additional optimization for decreasing the average time spent categorizing objects may also be implemented. For example, the object categorization janitor may apply category recognizers to the object in an order that applies category recognizers more likely to identify a category for the object before applying category recognizers less likely to identify a category for the object. By applying recognizers in an order based on the frequency with which they return a category result, the object categorization janitor may be able to categorize objects more quickly.

Figure 7:
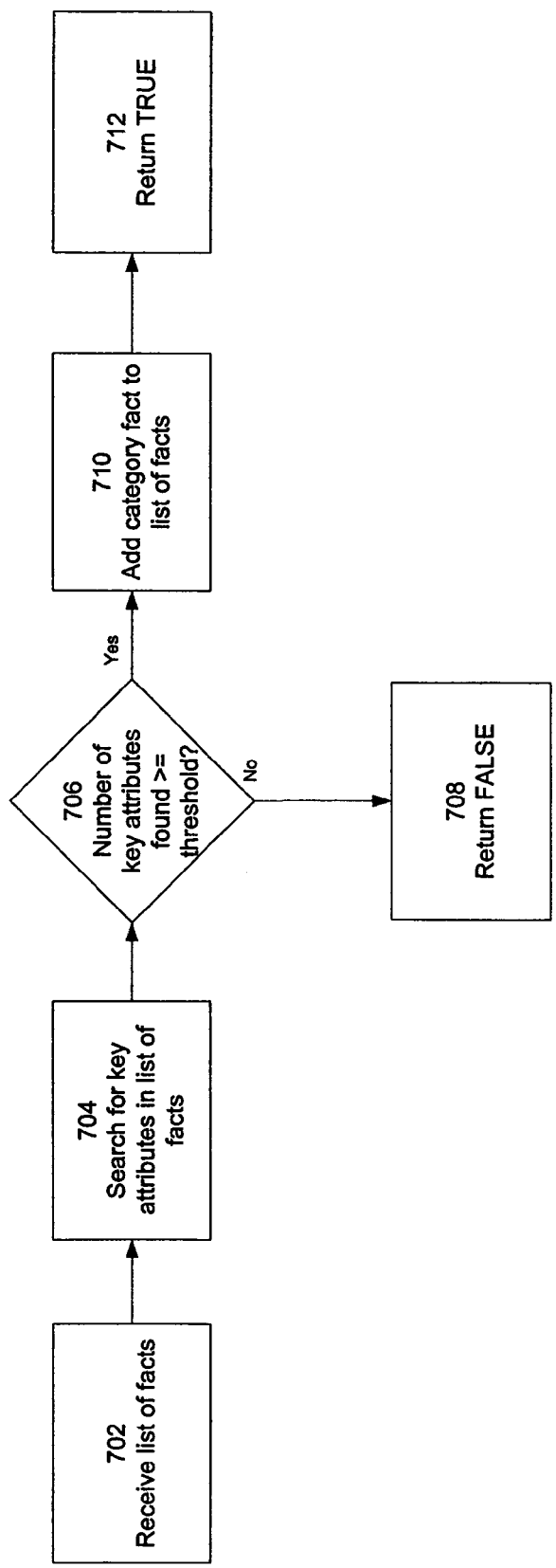
FIG. 7 is a flow chart illustrating a method of a category recognizer, according to one embodiment of the present invention.

FIG. 7 is a flow chart illustrating a method for determining if an object is of a certain category, according to one embodiment of the present invention. According to one embodiment of the present invention, the method is performed by a category recognizer.

The category recognizer receives 702 a list of facts. Receiving the list of facts may include retrieving facts on the basis of an object ID, or the facts may be passed to the category recognizer at the time the category recognizer is called.

The category recognizer searches 704 for key attributes in the attributes of the facts in the list. Key attributes are attributes of a specific pattern or property. The definition of key attributes may vary from category recognizer to category recognizer. Examples of various key attribute definitions for an assortment of category recognizers are illustrated in FIG. 8. The category recognizer may search 702 for key attributes using for example any of the well-known methods in the art for regular expression handling or string searching.

Searching 704 for key attributes is beneficial as it is one method in which the category recognizer may determine if certain facts exist in association with an object. It is to be noted that other methods may be implemented for determining if facts exist in association with an object without departing from the scope of the present invention.

The category recognizer determines 706 if the number of key attributes found in the list of facts is above a threshold. The threshold may vary from category recognizer to category recognizer. The threshold may be expressed as numerical value, or it may be expressed as a function returning a numerical value. Example of various threshold definitions for an assortment of category recognizers are illustrated in FIG. 8. If the category recognizer determines 706 that the number of key attributes found in the list of facts is not above the threshold, the category recognizer returns 708 an indication that no category was recognized.

If the category recognizer determines 706 that the number of key attributes found in the list of facts is above the threshold, the category recognizer adds 710 a category fact to the list of facts. According to one embodiment of the present invention, the category recognizer adds 710 a category to the list of facts by creating or instantiating a new fact and associating it with the object whose facts were received in 702. Where the list of facts are associated with an object, the category recognizer may create a new fact and associate it with the object. For example, this new fact may have the attribute of 'category' and a value particular to each category recognizer, such as category of object which the object recognizer is intended to recognize.

The category recognizer returns 712 an indication that a category was recognized.

According to one embodiment of the present invention, the category recognizer also searches for key values in the list of facts. The category recognizer may consider fact attributes, fact values, or both, to determine if an object is above the threshold to be considered a member of a category.

FIG. 8 is a chart illustrating examples of different category recognizer functions. Each recognizer has some category of object it is intended to recognize, a list or definition of key attributes, and a threshold. The category of object recognized, the definition of key attributes, and the threshold may be used in conjunction with a method such as the one described herein with reference to FIG. 7.

For example, the recognizer of objects of the category 'person' may search for the key attributes 'name' and 'birthday'. The threshold for determining that an object is of the category 'person' may require that two (i.e., both) of these attributes are found in the list of facts associated with that object.

As another example, the recognizer of objects of the category 'weather page' may search for key attributes such as 'morning', 'afternoon', 'dewpoint' etc. The threshold for determining that an object is of the category 'weather page' may require both that at least four of these attributes are found in the list of facts associated with that object, and that at least 75% of the facts associated with that object have attributes from the key attribute list.

As another example, the recognizer of objects of the category 'image summary' may search for key attributes 'album name', 'filename', etc. The threshold for determining that an object is of the category 'image summary' may require that at least five of these key attributes are found in the list of facts associated with that object.

As yet another example, the recognizer of objects of the category 'direction list' may search for key attributes matching the pattern 'step ?i', where ?i represents any integer. Therefore, all facts with attributes including the word 'step' and then an integer would be determined to match the key attributes. The threshold for determining that an object is of the category 'direction list' may require every fact associated with that object be of the pattern of the key attributes. That is, the category recognizer for 'direction list' objects may only determine than an object is a 'direction list' if every associated fact includes the word 'step' followed by an integer. According to one embodiment of the present invention, certain types of facts may be exempt from the criteria that every associated fact include a certain key attribute(s). For example, category facts, name facts, description facts, and forwarding facts might be ignored for the purposes of determining if every associated fact includes a certain key attribute(s).

By searching for key attributes with complex definition, such as in the example given above of defining a key attribute by a pattern, the category recognizer is able to determine if facts exist despite differences in spelling, typographical errors, or other changes in form. In turn, the object categorization janitor is capable of categorizing objects on the basis of the existence of facts having broad definition.

As yet another example, the recognizer of objects of the category 'Book' may search for key attributes such as 'ISBN', 'Title', 'Author', and 'Publisher'. The threshold for determining than an object is of the category 'Book' may be dependent on which key attributes are found in the list of facts associated with the object. For example, if the key attribute 'ISBN' is found in the list of facts associated with the object, the presence of that attribute alone is sufficient to associate the object with the 'Book' category. Alternatively, if the key attribute 'ISBN' is not found, the presence of two key attributes is used as the threshold to associate the with the 'Book' category. The key attribute 'ISBN' has been selected for the purposes of illustration as an example of a key attribute that would be particularly conclusive if found in the list of facts associated with an object.

By having the threshold depend on which key attributes are found, the category recognizer is able to weight the conclusiveness of the presence of various attributes. Thus the presence of a singly highly conclusive attribute (or several highly conclusive attributes) may be sufficient to associate an object with a category.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention can be embodied in software, firmware or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

While the invention has been particularly shown and described with reference to a preferred embodiment and several alternate embodiments, it will be understood by persons skilled in the relevant art that various changes in form and details can be made therein without departing from the spirit and scope of the invention.

What is claimed is:

1. A method of categorizing objects in a database comprising:
    identifying an object in the database, the object associated with one or more facts, wherein each fact comprises an attribute and a value;
    identifying key attributes of the one or more facts associated with the object, the key attributes being a predefined set of attributes associated with objects in a particular category; and
    categorizing the object as belonging to the particular category, responsive at least in part to the identified key attributes.

2. The method of claim 1, further comprising:
    creating a new fact associated with the object, the new fact comprising an attribute indicating that the new fact is a category fact and a value indicating the particular category.

3. The method of claim 2, further comprising:
    retrieving the object from the database based at least in part on the value of the new fact.

4. The method of claim 1, wherein categorizing the object comprises comparing at least one attribute of the one or more facts associated with the object to the key attribute.

5. The method of claim 4, wherein the at least one attribute of the one or more facts associated with the object comprises strings and the key attribute comprises a string pattern, and wherein categorizing the object comprises comparing the strings to the string pattern.

6. The method of claim 1, wherein categorizing the object further comprises comparing at least one value of the one or more facts associated with the object to a key value.

7. The method of claim 1, wherein categorizing the object further comprises searching for matches between a list of key values and one or more values of the one or more facts associated with the object, and determining if a number of matches between the list of key values and the one or more values of the one or more facts associated with the object is above a threshold.

8. The method of claim 7, wherein the threshold is determined responsive to a total number of facts associated with the object.

9. The method of claim 1, wherein categorizing the object further comprises searching for matches between a list of key attributes and the one or more attributes of the one or more facts associated with the object, and determining if a number of matches between the list of key attributes and the one or more attributes of the one or more facts associated with the object is above a threshold.

10. The method of claim 9, wherein the threshold is a predetermined number.

11. The method of claim 9, wherein the threshold is determined responsive at least in part to a total number of facts associated with the object.

12. The method of claim 9, wherein the threshold is represented as a percentage and wherein determining if a number of matches is above a threshold comprises determining whether a percentage of matching attributes relative to a total number of facts associated with the object exceeds the threshold.

13. A method for categorizing objects in a database comprising:
    identifying an object in the database, the object associated with at least one fact, the fact comprising an attribute and a value;
    identifying a first attribute of a first fact associated with the object;
    determining if the object belongs to a first category responsive at least in part to the identified attribute; and
    responsive to determining that the object does not belong to the first category, determining if the object belongs to a second category responsive at least in part to a second attribute of a second fact associated with the object.

14. A computer program product having a tangible computer-readable storage medium encoded with program code for categorizing objects in a database, the computer readable-medium comprising program code for:
    identifying an object in the database, the object associated with at least one fact comprising an attribute and a value;
    identifying key attributes of the one or more facts associated with the object, the key attribute being a predefined set of attributes associated with objects in a particular category; and categorizing the object as belonging to the particular category, responsive at least in part to the identified key attribute.

15. A computer-implemented system for creating a category fact for an object stored in a database, the system comprising:
- a fact retriever for receiving an identifier identifying an object associated with one or more facts, each fact comprising an attribute and a value, and for retrieving from the database one or more attributes of facts associated with the identified object;
- a fact creator for analyzing the retrieved attributes and for creating a new fact that categorizes the object; and
- a fact associator for storing the new fact with the object in the database.

16. The system of claim 15, further comprising:
- an object retriever for retrieving the object from the database responsive at least in part to a value of the new fact.

17. The system of claim 15, wherein the fact creator compares at least one attribute of the one or more facts associated with the object to a key attribute.

18. The system of claim 17, wherein the retrieved attributes comprise strings and the key attribute comprises a string pattern, and wherein the fact creator compares the strings to the string pattern.

19. The system of claim 15, wherein the fact creator compares at least one value of the one or more facts associated with the object to a key value.

20. The system of claim 15, wherein the fact creator searches for matches between a list of key values and one or more values of the one or more facts associated with the object, and determines if a number of matches between the list of key values and the one or more values of the one or more facts associated with the object is above a threshold.

21. The system of claim 15, wherein the fact creator searches for matches between a list of key attributes and one or more attributes of the one or more facts associated with the object, and determines if a number of matches between the list of key attributes and the one or more attributes of the one or more facts associated with the object is above a threshold.

* * * * *